F. J. FISHER.
MOLDING MACHINE.
APPLICATION FILED MAY 10, 1915.

1,171,937.

Patented Feb. 15, 1916.
2 SHEETS—SHEET 1.

WITNESSES:
Charles Rickles
Thos Lastberg

INVENTOR
Frederick J. Fisher,
BY G. H. Strong,
ATTORNEY

F. J. FISHER.
MOLDING MACHINE.
APPLICATION FILED MAY 10, 1915.

1,171,937.

Patented Feb. 15, 1916.
2 SHEETS—SHEET 2.

WITNESSES:
Charles Pickles
Thos Eastberg

INVENTOR
Frederick J. Fisher
BY G. H. Strong
ATTORNEY

UNITED STATES PATENT OFFICE.

FREDERICK J. FISHER, OF SAN FRANCISCO, CALIFORNIA, ASSIGNOR OF NINE-TENTHS TO OTTO MULLER, OF SAN FRANCISCO, CALIFORNIA.

MOLDING-MACHINE.

1,171,937.   Specification of Letters Patent.   Patented Feb. 15, 1916.

Application filed May 10, 1915. Serial No. 27,049.

*To all whom it may concern:*

Be it known that I, FREDERICK J. FISHER, a citizen of the United States, residing in the city and county of San Francisco and State of California, have invented new and useful Improvements in Molding-Machines, of which the following is a specification.

This invention relates to a molding machine.

One of the objects of the present invention is to provide a simple, substantial and easily operated molding machine which in this instance is particularly designed for molding meat cakes or Hamburger steak.

Another object of the invention is to provide a hopper into which the material to be molded is placed; and to provide means, such as a plunger, for compressing and forcing the plastic material out of the container; and to provide a movable molding plate which is adapted to be brought into or out of register with a plurality of discharge openings formed in the bottom of the container.

Another object of the invention is to provide means for readily removing the molded material from the molding plate.

Further objects will hereinafter appear.

The invention consists of the parts and the construction and combination of parts as hereinafter more fully described and claimed, having reference to the accompanying drawings, in which—

Figure 1:
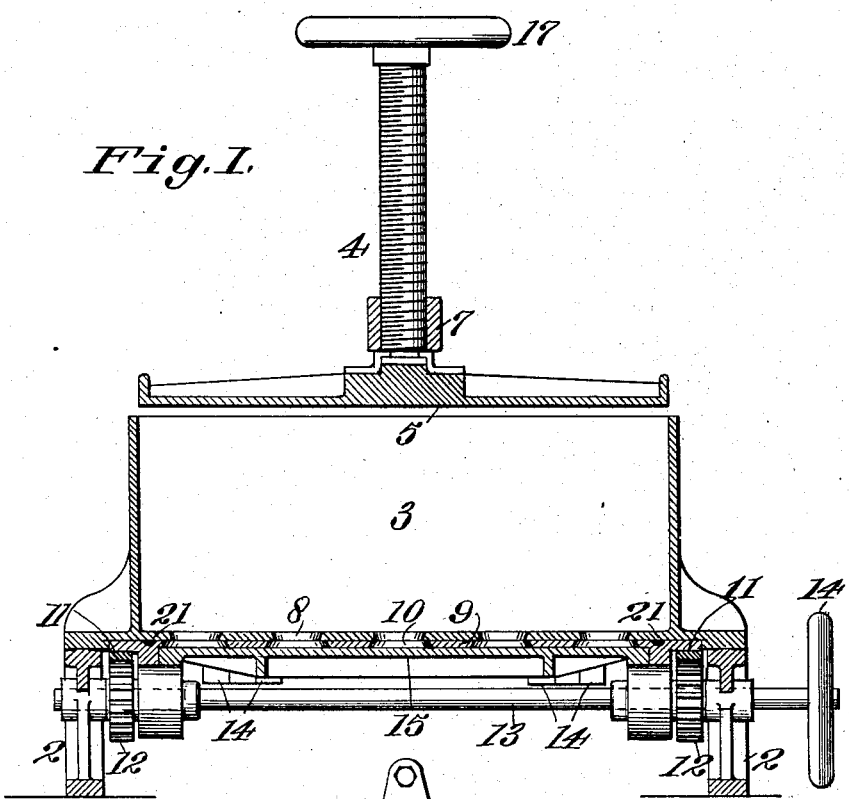
Figure 2:
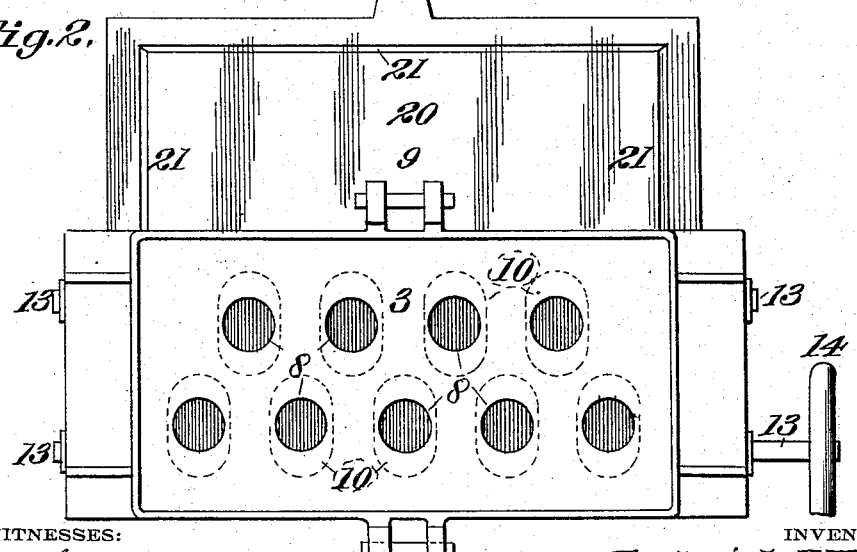
Figure 3:
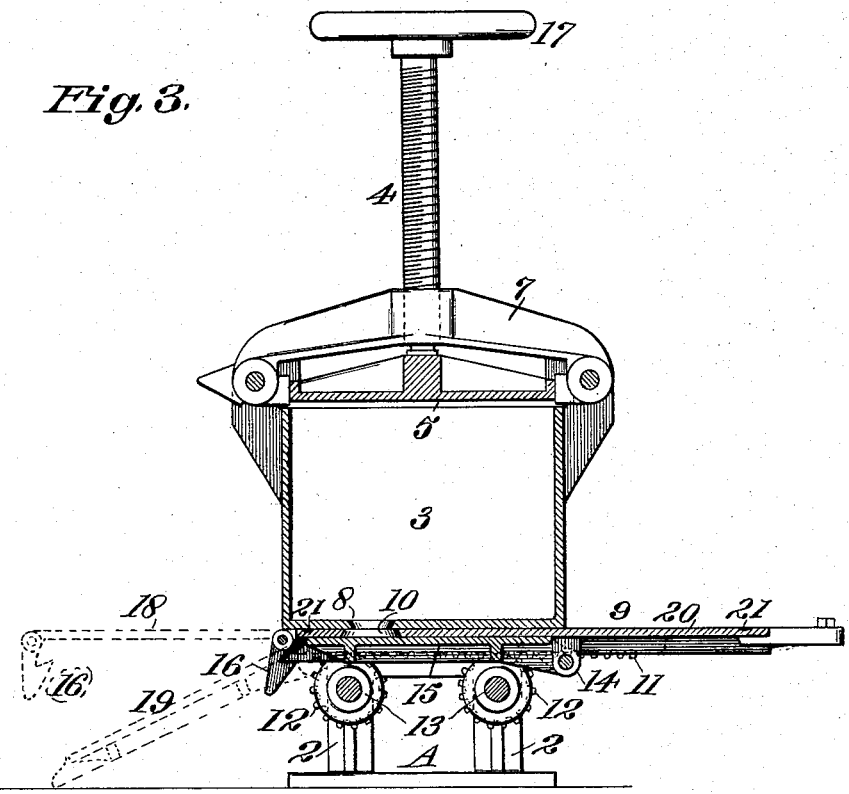
Figure 4:
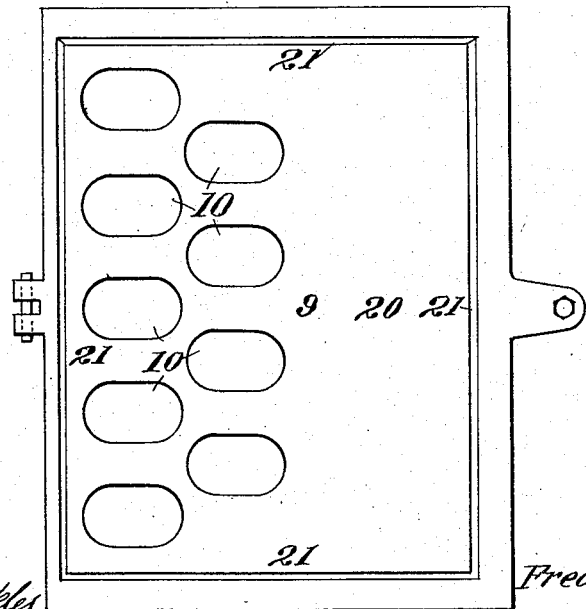

Figure 1 is a plan view of the mold. Fig. 2 is a vertical, longitudinal section of the same. Fig. 3 is a cross section. Fig. 4 is a plan view of the molding plate.

More particularly described, A indicates in general a base or support, consisting of a pair of connected standards 2, upon which is mounted a rectangular-shaped hopper 3. Adapted to be raised and lowered within said hopper, by means of a screw rod 4, is a plunger 5; the rod and plunger being supported by a pivotally mounted cross bar 7 which may be swung to one side when it is desired to clean or refill the hopper.

Formed in the bottom of the hopper is a plurality of discharge openings 8, and mounted below said openings is a molding plate 9 in which is formed a plurality of openings 10 which are normally in register with the discharge openings 8 formed in the bottom of the hopper. The molding plate is, in this instance, provided on its lower face and outer edges with a pair of rack bars 11. one on each side of the plate, and these bars are in turn positioned so as to intermesh with a pair of pinions 12 journaled upon shafts 13, there being one pair of shafts and four pinions, two on each side of the plate. One of the shafts 13 is provided with a hand-wheel 14 by which the shaft and pinions may be turned to move the molding plate as will hereinafter be described. Pivotally mounted, as at 14, on the lower side of the molding plate is a platform 15 which is normally adapted to form a closure for the openings 10 formed in the molding plate. Platform 15 is adapted to be raised and lowered with relation to the molding plate, or, in other words, swung about pivot 14 and is normally held in the raised position by means of a latch 16 of suitable construction.

In operation, when the hopper is filled with a plastic material and the molding plate is in the position indicated in Fig. 3, it is only necessary to rotate the screw by means of a hand-wheel 17. This will cause the plunger to move in a downward direction and force the material through the discharge openings into the registering openings 10 in the molding plate. After these openings have become filled or charged, it is only necessary to turn hand-wheel 14 in a direction which will cause the rack bars, with connected molding plate, to move forward into the dotted line position indicated at 18. Latch 16 is here released and the platform 15 is permitted to drop into the inclined position indicated at 19. The plastic material having a tendency to adhere to this plate will thus be extracted from the openings in the molding plate and may here be removed from the platform in any suitable manner.

For the purpose of preventing the plastic material from adhering to the face of platform 15, and also for the purpose of quickly removing the molded articles, a thin sheet of paraffined paper is preferably laid across the face of the platform. It is then raised to close the openings formed in the molding plate and locked in this position by means of the latch 16. The gears are then turned, by means of the hand-wheel 14, to move the mold back into the charging position shown in Fig. 3 where more material is admitted by forcing the plunger in a downward direction. Formed on one end of the molding plate is an extension 20. This is only provided for the purpose of closing the discharge openings 8 in the bottom of the hopper when the molding plate is moved forward to remove the plastic or molded material.

The machine constructed and shown in the present application is particularly provided for molding Hamburger steak. For the purpose of preventing leakage around the hopper of meat juice, or, in other words, for the purpose of collecting such juice as may be forced out of the meat while under pressure in the hopper, a groove, such as indicated at 21, has been formed around the exterior edge of the molding plate. Any juice escaping from the hopper will thus have a tendency to collect in this groove and may be wiped out as occasion and conditions demand, thus preventing the machine and support from becoming soiled or contaminated. The materials and finish of the several parts of the machine are otherwise such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a molding machine, a hopper having a plurality of discharge openings formed therein, a molding plate slidably mounted under the hopper, said plate having openings formed therein adapted to register with the openings in the hopper, a platform plate pivotally mounted on the lower side of the molding plate, and means for moving said plates in unison to bring the mold plate openings into and out of register with the discharge openings in the hopper.

2. In a molding machine, a hopper having a plurality of discharge openings formed therein, a molding plate slidably mounted under the hopper, said plate having openings formed therein adapted to register with the openings in the hopper, a platform plate pivotally mounted on the lower side of the molding plate, means for moving said plates in unison to bring the mold plate openings into and out of register with the discharge openings in the hopper, and means for exerting pressure on the contents of the hopper to fill the openings in the molding plate.

3. In a molding machine, a hopper having a plurality of discharge openings formed therein, a molding plate slidably mounted under the hopper, said plate having openings formed therein adapted to register with the openings in the hopper, a platform plate pivotally mounted on the lower side of the molding plate, means for moving said plates in unison to bring the mold plate openings into and out of register with the discharge openings in the hopper, and means for locking the platform plate with relation to the molding plate.

4. In a molding machine, a hopper having a plurality of discharge openings formed therein, a molding plate slidably mounted under the hopper, said plate having openings formed therein adapted to register with the openings in the hopper, a platform plate pivotally mounted on the lower side of the molding plate, means for moving said plates in unison to bring the mold plate openings into and out of register with the discharge openings in the hopper, means for locking the platform plate with relation to the molding plate, and means for exerting pressure on the contents of the hopper to fill the openings in the molding plate.

5. A machine of the character described, comprising a frame, a hopper adapted to receive a plastic material supported on said frame, said hopper having a plurality of discharge openings formed in the bottom, a plunger mounted in the hopper, means for raising and lowering said plunger, a molding plate mounted below the hopper, said plate having a plurality of openings formed therein adapted to register with the discharge openings in the hopper, a supporting or discharging plate pivotally mounted on the lower side of the molding plate, and means for moving said plates to one side of the hopper to discharge the contents of the molding plate.

6. A machine of the character described, comprising a frame, a hopper adapted to receive a plastic material supported on said frame, said hopper having a plurality of discharge openings formed in the bottom, a plunger mounted in the hopper, means for raising and lowering said plunger, a molding plate mounted below the hopper, said plate having a plurality of openings formed therein adapted to register with the discharge openings in the hopper, a supporting or discharging plate pivotally mounted on the lower side of the molding plate, means for raising and lowering the supporting or discharging plate with relation to the molding plate, means for locking the plates together, and means for moving said plates to one side of the hopper to discharge the contents of the molding plate.

7. A machine of the character described, comprising a frame, a hopper adapted to receive a plastic material supported on said frame, said hopper having a plurality of discharge openings formed in the bottom, a plunger mounted in the hopper, means for raising and lowering said plunger, a molding plate mounted below the hopper, said plate having a plurality of openings formed therein adapted to register with the discharge openings in the hopper, a supporting or discharging plate pivotally mounted on the lower side of the molding plate, means for raising and lowering the supporting or discharging plate with relation to the molding plate, means for locking the plates together, means for moving said plates to one side of the hopper to discharge the contents of the molding plate, said means comprising rack bars secured on the molding plate, pinion gears journaled in the frame and engageable with the rack bars, and means for revolving said gears.

In testimony whereof I have hereunto set my hand in the presence of two subscribing witnesses.

FREDERICK J. FISHER.

Witnesses:
W. W. HEALEY,
M. E. EWING.

Copies of this patent may be obtained for five cents each, by addressing the "Commissioner of Patents, Washington, D. C."